United States Patent
Subbarayan et al.

(10) Patent No.: US 10,032,194 B2
(45) Date of Patent: Jul. 24, 2018

(54) ENCOURAGING SUPPORT OF AN ENTITY BASED UPON SOCIAL NETWORKING POST CONTENT

(71) Applicant: Facebook, Inc., Menlo Park, CA (US)

(72) Inventors: Anand Subbarayan, Fremont, CA (US); Bikash K. Agarwalla, Fremont, CA (US); Christopher J. Triolo, San Francisco, CA (US); Timothy M. Quirino, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 585 days.

(21) Appl. No.: 14/589,956

(22) Filed: Jan. 5, 2015

(65) Prior Publication Data
US 2016/0196589 A1    Jul. 7, 2016

(51) Int. Cl.
| | |
|---|---|
| G06Q 30/02 | (2012.01) |
| H04L 29/06 | (2006.01) |
| H04L 29/08 | (2006.01) |
| G06Q 50/00 | (2012.01) |

(52) U.S. Cl.
CPC ....... G06Q 30/0279 (2013.01); H04L 65/403 (2013.01); H04L 67/306 (2013.01); *G06Q 50/01* (2013.01)

(58) Field of Classification Search
CPC ............ G06Q 30/0279; G06F 17/3089; H04L 65/403
USPC ........ 709/204, 206, 231, 248; 707/711, 737, 707/741; 715/733, 736, 764
See application file for complete search history.

(56) References Cited

U.S. PATENT DOCUMENTS

| | | | |
|---|---|---|---|
| 8,682,918 B2* | 3/2014 | Ramanujam | G06F 17/30867 707/737 |
| 9,105,054 B2* | 8/2015 | Sobhani | G06Q 20/06 |
| 2012/0323930 A1* | 12/2012 | Kennberg | H04L 63/101 707/748 |
| 2014/0156746 A1* | 6/2014 | Wheatley | H04L 67/22 709/204 |
| 2015/0100509 A1* | 4/2015 | Pappas | G06F 17/30867 705/319 |
| 2016/0219089 A1* | 7/2016 | Murthy | H04L 65/4076 |

OTHER PUBLICATIONS

"Mining Expertise and Interests from Social Media"—Guy et al, IBM Research Lab, May 2013 https://www.research.ibm.com/haifa/dept/imt/papers/GuyWWW13.pdf*

* cited by examiner

*Primary Examiner* — Randy Scott
(74) *Attorney, Agent, or Firm* — Keller Jolley Preece

(57) ABSTRACT

Exemplary methods, apparatuses, and systems receive a first input that is associated with a first user profile of a social networking system. The first input includes content, such as a string of text, to be published to the system. A key word is mapped from the received content to an entity and additional content that is an affirmation of support for the entity is suggested for inclusion with the received content. The suggestion of the additional content is transmitted to a user device associated with the first user. A second input confirming the inclusion of the additional content is received. The received content and the additional content are published to the social networking system as a post associated with the first user profile.

20 Claims, 12 Drawing Sheets

ENCOURAGING SUPPORT OF AN ENTITY BASED UPON SOCIAL NETWORKING POST CONTENT

FIELD

Embodiments described herein relate to publishing content in social networking systems. Specifically, the embodiments relate to publishing additional content that is suggested by a social networking system with content composed by or selected by a user for publication.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

SUMMARY OF THE DESCRIPTION

Exemplary methods, apparatuses, and systems receive a first input that is associated with a first user profile of a social networking system. The first input includes content, such as a string of text, to be published to the system. A key word is detected in the received content and mapped to an entity. For example, the social networking system may receive text during user composition of a post. The social networking system parses the text and determines that the text includes one or more words that are commonly used in support of or otherwise associated with a person or an organization. In response to detecting and mapping the received content to an entity, additional content in affirmation of support for the entity is suggested for inclusion with the received content. For example, the one or more words and/or the entity may be mapped to additional text, a link, an image, or other content to support or promote the entity. The suggestion of the additional content is transmitted to a user device associated with the first user. A second input from the first user confirming the inclusion of the additional content is received. The received content and the suggested additional content are published to the social networking system as a post associated with the first user profile.

In some exemplary embodiments, the additional content includes a link that enables an action in support of the entity to be performed. For example, user selection of the link may cause the user device to navigate to or otherwise display an interface enabling the user to make a donation, register to volunteer or provide a service, write a testimonial, etc.

Other features and advantages will be apparent from the accompanying drawings and from the detailed description.

BRIEF DESCRIPTION OF THE DRAWINGS

Embodiments described herein are illustrated by way of example and not limitation in the accompanying figures, in which like references indicate similar elements, and in which.

DETAILED DESCRIPTION

Users of a social networking system share content by posting electronic messages to the social networking system. For example, posts may include media and/or content describing a state of mind, plans, activities, etc. In particular, users may create posts as statements of support for an entity and/or encouraging each other to support an entity (e.g., a business, an organization, an event, a university, a manufacturer, a brand, a celebrity, a charitable cause, a fundraiser, etc.). The impact of such posts, however, may be limited due to a lack of consistency in identifying the corresponding entity, a lack of consistency in the message published, or a lack of a call to action that enables other users to provide support by interacting with the posts. For example, users interested in providing support for a particular entity might be required to expend additional effort outside of the social networking system in order to provide the requested support. As a result of the required additional effort, users may be discouraged from taking action. Accordingly, embodiments described herein enable users to provide a clear identification of the entity/message and enable other users to easily answer a call to support the entity based on content within posts published to a social networking system. As a result, users benefit from the ability to easily recognize and provide support for one or more entities.

In the following description, numerous specific details are set forth. However, it is understood that embodiments of the invention may be practiced without these specific details. References in the specification to "one embodiment," "an embodiment," "an exemplary embodiment," "another embodiment," etc., indicate that the embodiment described may include a particular feature, structure, or characteristic, but every embodiment may not necessarily include the particular feature, structure, or characteristic. Moreover, such phrases are not necessarily referring to the same embodiment. Additionally, as used herein, the term "exemplary" and its variations refer to embodiments that serve simply as an example or illustration. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
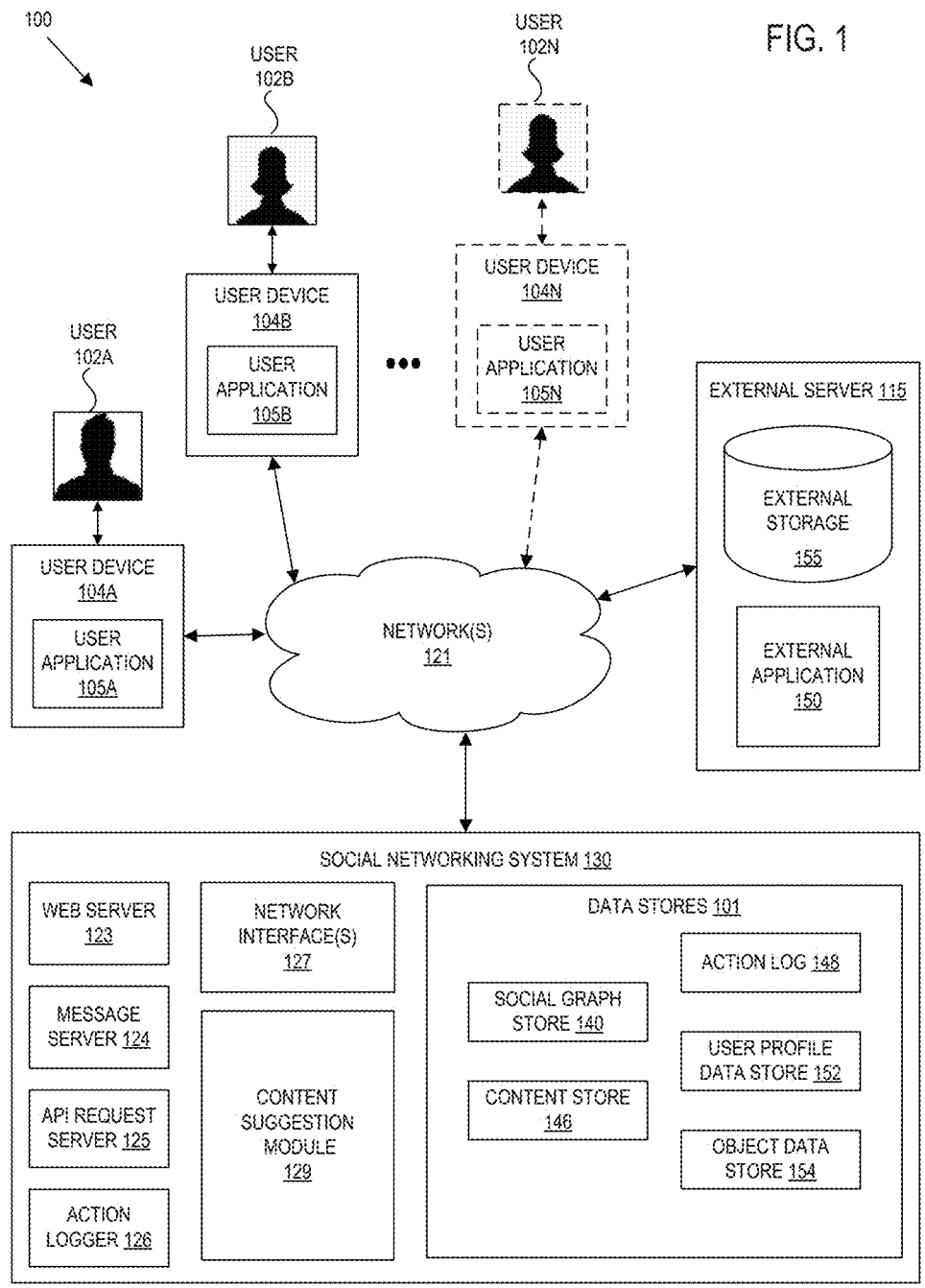
FIG. 1 illustrates an exemplary network environment of a system, including a social networking system.

FIG. 1 illustrates an exemplary network environment of a system 100 including a social networking system 130 that offers users 102A-102N the ability to communicate and interact with other users 102A-102N and entities of the social networking system 130 according to an embodiment. The illustrated social networking system 130 includes a content suggestion module 129 for assisting in the composition of a post associated with a first user of system 130 such that the post includes additional content. The additional content is suggested based upon input received during composition of the post and clarifies and/or enables others to easily act in support of an entity.

In some embodiments, the social networking system 130 comprises one or more computing devices storing user profiles associated with users 102A-102N and/or other objects, as well as connections between users and other users 102A-102N and/or objects.

User devices 104A-104N can interact with social networking system 130 and can be any type of computer capable of receiving user input as well as transmitting and/or receiving data via a network (e.g., network(s) 121). Exemplary user devices 104A-104N include conventional computer systems, such as a desktop or laptop computer, or may include devices having computer functionalities such as Personal Digital Assistants (PDA), cellular or mobile telephones, smartphones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application. In an embodiment, the user application 105A is a client application (e.g., Facebook™ for iPhone or iPad, etc.), and in an embodiment the user application 105A is the native operating system of the user device 104A, such as Windows®, Mac OSX®, iOS®, or ANDROID™, which may utilize an Application Programming Interface (API) to directly interface with the social networking system 130 through API request server 125.

The user devices 104A-104N can communicate with the social networking system 130 via a network 121 or collection of networks, such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols.

The social networking system 130 relies upon information representing its users 102A-102N and a set of objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, fundraisers, events, charitable causes, etc.), concepts, or other non-human things including but not limited to a location, an album, an article, a book, a concept, a movie, food, etc.

In some embodiments, the social networking system 130 also allows users to interact with external (e.g., third-party) applications 150 (e.g., websites), external storage 155, and/or external servers 115 (e.g., server end stations, aggregators, etc.).

Based on the stored data about users, objects, and the connections between the users and/or objects, the social networking system 130 generates and maintains a social graph in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions. An exemplary social graph is described with reference to FIG. 2.

To provide these functionalities, one embodiment of the social networking system 130 includes a web server 123, a message server 124, an API request server 125, an action logger 126, and a set of data stores 101. This embodiment also includes, within the data stores 101, a social graph store 140, a content store 146, an action log 148, a user profile data store 152, and an object data store 154. In one embodiment, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images, videos, and location data provided by the user may also be stored within the user profile. In one embodiment, only textual data of the user is stored in the user profile and other data (e.g., images, videos, etc.) are stored in multimedia stores and associated with the user (e.g., through associating a user identifier of the user with an image/video identifier of the multimedia content). In one embodiment, images, videos, and posts by users including or depicting one or more other users of the social networking system 130 may be tagged with identification information of those users. As used herein, tagging users with identification information refers to associating the identification information with the users. A user profile in the user profile data store 152 may also maintain references to actions (stored in the user profile or in an action log 148) by the corresponding user performed on content items in a content store 146. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests from the user devices 104A-104N and/or transmitting webpages or other web-related content to the user devices 104A-104N, such as image files, audio files, video files, Java applets, Flash, XML, JavaScript, Cascading Style Sheets (CSS), and so forth. The web server 123, in one embodiment, is configured to utilize a set of one or more network interfaces 127 to send and receive messages across the network 121. In one embodiment, the web server 123 (additionally or alternately) utilizes a message server 124 (e.g., a dedicated server end station, a dedicated software application, etc.) to communicate with the user devices 104A-104N. The message server 124 is operative to send and/or receive instant messages, queued messages (e.g., email), text and SMS (Short Message Service) messages, or utilize any other suitable messaging technique.

In one embodiment, the social networking system 130 sends a message composed by a user to another user, which can be viewed by other users of the social networking system 130, e.g., by certain connections of the user (directly connected users in the social graph, other users more than one hop away in the social graph, etc.) receiving the message. An example of a type of message that can be viewed by other users of the social networking system 130 (besides the recipient of the message) is commonly known as a post. In one embodiment, a user can send a private message to another user that can only be retrieved by the other user. These messages are stored in storage such as message server 124.

When a user takes an action within the social networking system 130, an action logger 126, subject to any privacy settings and restrictions of the user and/or social networking system 130, may record the action in an action log 148. In one embodiment, the social networking system 130 maintains the action log 148 as a database of entries. When an action is taken on the social networking system 130, the social networking system 130 can add an entry for that action to the action log 148. According to one embodiment, the action logger 126 can receive communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., posts, images, videos) associated with or created by the other user, attending an event posted by another user, being tagged in posts or photos with/by another user, etc. In one embodiment, certain actions are described in connection with more than one user, and these actions may be associated with those users as well and stored in the action log 148.

The action log 148 may be used by the social networking system 130 to track other user actions on the social networking system 130, as well as actions on an external application 150 (e.g., website) that are communicated to the social networking system 130. Users 102A-102N may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130 using user devices 104A-104N, checking in to a location on the social networking system 130 using user devices 104A-104N, commenting on a photo album via user devices 104A-104N, communications between users' user devices 104A-104N, becoming a fan of a musician or brand by liking a page of the respective entity using user devices 104A-104N, adding an event to a calendar using user devices 104A-104N, joining a group using user devices 104A-104N, creating an event using user devices 104A-104N, authorizing an application using user devices 104A-104N, using an application using user devices 104A-104N, and engaging in a transaction using user devices 104A-104N. Additionally, the action log 148 records a user's interactions with advertisements on the social networking system 130 as well as other applications operating on the social networking system 130. In one embodiment, data from the action log 148 is used to infer interests or preferences of the user, augmenting the interests included in the user profile and allowing a more complete understanding of user preferences.

The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status, commonly known as a status update. Additionally, other content items may facilitate user engagement by encouraging a user to expand his connections to other users or entities, to invite users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status updates, messages, or links posted by users to the social networking system, events, groups, pages (e.g., representing an organization or commercial entity), and any other content provided by, or accessible via, the social networking system 130.

The content store 146 also includes one or more pages associated with entities included social graph store 140. In one embodiment, an entity is a type of object that can be a non-individual user of the social networking system 130, such as a business, a vendor, an organization, or a university, a cause, an event, etc. In one embodiment, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). In one embodiment, a page includes content associated with an entity and instructions for presenting the content to a user of the social networking system 130. For example, a page identifies content associated with the entity's stored content (from the object data store 154) and information describing how to present the content to users viewing the page.

In the depicted embodiment, the social networking system 130 includes a content suggestion module 129. The content suggestion module 129 performs or causes one or more of user devices 104A-N to perform one or more functions for parsing content of a post, mapping the parsed content to an entity, and suggesting additional content in support of the entity based on the parsed content and/or entity mapping, as described in further detail herein. While embodiments described herein refer to method(s) performed by the content suggestion module 129, all or part of the method(s) (e.g., method 300) may be spread across multiple components of social networking system 130 and/or may be performed by an external application 150 running on an external server 115 or user application 105 running on user device 104.

Figure 2:
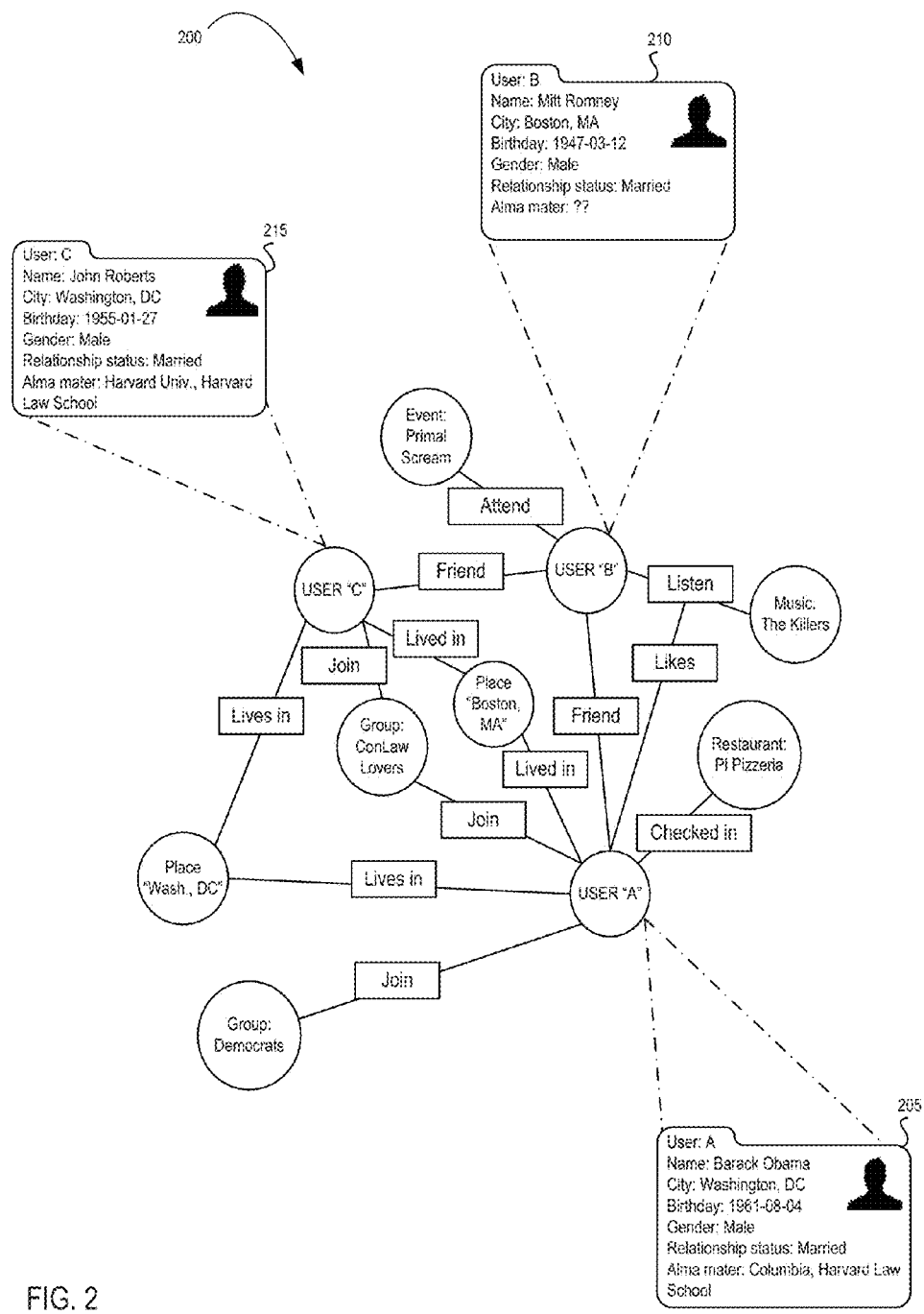
FIG. 2 illustrates a graph of social network data.

FIG. 2 illustrates an exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that User A previously lived in Boston, currently lives in Washington D.C., joined groups for Democrats and ConLaw Lovers, checked in at Pi Pizzeria in St. Louis, Miss., and is friends with User B. User B and User C have also performed a number of actions with respect to objects within graph 200.

In one embodiment, users, such as Users A-C, are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, demographic data further includes a weight or score indicating an affinity between a user and an object, such as an entity. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than when two users are friends. Additionally, temporal and geographic proximity of actions/users are other exemplary indicators of affinity.

In one embodiment, users are able to provide feedback on actions of other users/entities. As a result, actions are also objects that may be acted upon. For example, User B listened to music by the artist, The Killers. Consequently, the social networking system can publish a narrative associated with User B (e.g., in a newsfeed, profile of User B, etc.) indicating that User B listened to The Killers. In viewing a newsfeed, profile of User B, or another form of social networking system publication(s), the social networking system can display the narrative as a post 220 to Users A, User B, and/or User C. The social networking system then receives input from User A indicating that User A "likes" that User B listened to The Killers.

In one embodiment, users may select privacy settings to control what network service data is shared, with whom the data is shared, and/or what data is used for selecting candidate objects. For example, the privacy settings of User B and/or User A can prevent User C from commenting on posts created by User B and/or User A.

Figure 3:
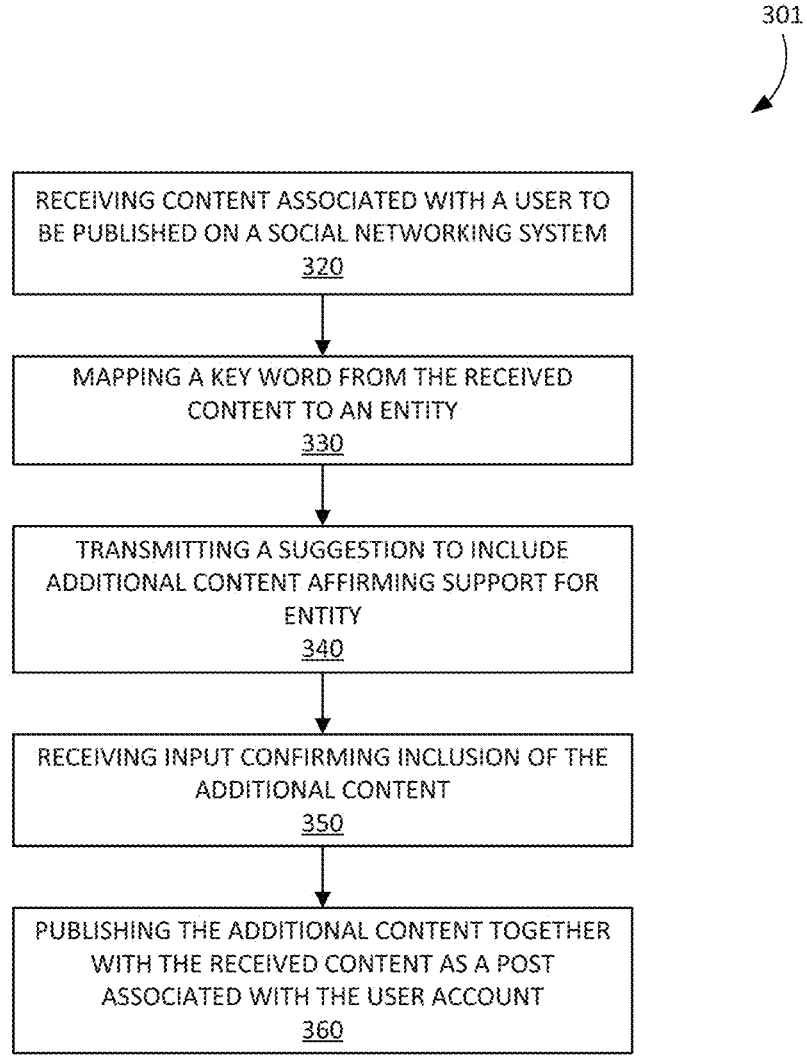
FIG. 3 illustrates, in flow chart form, a method of suggesting additional content about supporting an entity that is to be included in a social networking system post and publishing the post to the social networking system with the additional content.

FIG. 3 illustrates, in flow chart form, a method 301 of suggesting additional content about supporting an entity that is to be included in a social networking system post and publishing the post to the social networking system with the additional content. At block 320, the social networking system (e.g., content suggestion module 129) receives content to be published as a post. The content can be received as input from one of the user devices 104A-N, as described above in FIG. 1. In one embodiment, the received content includes a string of text. For example, a user of the social networking system may enter content within a post composition window or via a third-party application to indicate how the user is feeling, what the user is doing, watching, reading, listening to, drinking, eating, playing, that the user is traveling, etc. In one embodiment, the content is entered by the user manually typing out words or phrases using a keyboard (physical or virtual) or other input device that is part of the user's user device. In another embodiment, the user selects pre-composed content, e.g., by "clicking" on words, phrases, or images representing the content to be published using an input device that is part of the user's user device. In yet another embodiment, the user performs a combination of manually composing content and/or selecting pre-composed content, as described below with reference to at least one of FIG. 4A-4B, 5A-5C, 6A, 6B, or 7A-7C. The user entering content may also tag other users (e.g., a second user) in the content such that the social networking system associates the content with both the first user creating the post and the one or more tagged users.

At block 330, the social networking system parses the received content and determines that the received content includes one or more content items that are commonly used in support of or otherwise associated with a person or an organization. For example, the received content includes a string of text that is parsed to identify a keyword or phrase. The keyword or phrase is mapped to a specific entity/organization. For example, parsing a string of text to identify the phrase "ice bucket challenge" results in the social networking system mapping the phrase to one or more entities associated with the amyotrophic lateral sclerosis (ALS) disease. As another example, parsing a string of text including the phrase "Siberian tigers" may result in the social networking system mapping the phrase to one or more entities associated with the goal of wildlife conservation. In one embodiment, the parsing includes text normalization, stemming, and other methods of identifying content within text. The identified content is mapped, e.g., using a stored data structure, to the one or more entities and/or categories of entities. In another embodiment, user selection of pre-composed content maps directly to categories of entities without further analyzing text by way of normalization, stemming, etc. In yet another embodiment, the received content is analyzed for other content (e.g., an image, a video, audio media, etc.) and the analyzed content is mapped to one or more entities or categories of entities. For example, image recognition software is used to analyze the received content to identify specific images in an image or video sequence that have been associated with a specific topic or entity.

In one embodiment, the social networking system's identification of entities is further based upon one or more trending topics within the social networking system. As used herein, a trending topic refers a topic determined by the social networking system to be the subject of a large number of posts or other social networking system actions taken within a period of time. For example, when a threshold number of users of the social networking system include a specific content item (such as a string of text about a particular subject matter) in posts published within a threshold period of time, the social networking system designates the specific content item as a trending topic. The social networking system uses the trending topic to identify an entity. For example, when a natural disaster is mentioned by a certain number of users within a threshold period of time, the social networking system maps mentions of the natural disaster to one or more entities associated with providing charitable assistance to victims of the natural disaster. A trending topic can also be determined based upon posts including a link to content that is external to social networking system, responses to a group invite, subscriptions/following of a user, or other actions determined by the social networking system to include a common topic.

In one embodiment, each identified entity is ranked or otherwise attributed a score based upon information obtained by the social networking system. For example, the greater the proximity of a particular entity's location/physical address to a user's location/address (as determined by information from the user's profile or positioning data of a user device associated with the user's profile), the higher the score. Additionally, each identified entity can be ranked based on feedback data including user selection of an entity, indication of support for an entity, and/or another action taken to support an entity identified by the social networking system as described herein. Furthermore, entity feedback data may include how often the entity is included in users' posts, whether the individual user has "liked," "follows," left a positive rating for, or has created another relationship to the entity in the social graph, and/or a number of "likes" or other positive ratings for an entity generally. In one embodiment, the social networking system weights or otherwise prioritizes different types of entity feedback data (e.g., giving greater priority to actions taken by users based upon affinity to the user, similarities with the user, etc.).

In one embodiment, the social networking system uses the scores to order each identified entity, e.g., as presented to the user. In another embodiment, the social networking system selects those entities with a score above a threshold value for presentation to the user. In yet another embodiment, the social networking system selects only a threshold number of entities with the highest score. For example, the social networking system may present only a single, highest scoring entity to the user.

At block 340, the social networking system transmits, to the user device, a suggestion for a user composing a post on the user device. The suggestion encourages the user to include additional content affirming support for the identified entity. In one embodiment, the transmitted suggestion is a part of a GUI to be displayed to the user device.

At block 350, the social networking system receives input confirming (or rejecting) inclusion of the additional content. For example, a user may "click" or otherwise select a GUI element to include or reject the suggested additional content displayed within a GUI.

At block 360, the social networking system publishes the post including the received content (e.g., as described with reference to block 320) and the confirmed additional content (e.g., as described with reference to blocks 340-350). For example, the additional content may be text, an image, video, a user interface object presented within the post or as a part of media within the post, etc. In one embodiment, the additional content is published in a format that includes identification of the entity and that encourages other users to support the entity and/or facilitate that support. For example, the additional content is published as a user-selectable link that, when selected, causes the user device to navigate to or otherwise display an interface with selectable GUI elements to facilitate user action in support of the entity. In this example, the selectable GUI elements enable the user to make a donation, register to volunteer or provide a service, write a testimonial, share text/media content on behalf of the entity, or otherwise perform an action in support of the entity. Exemplary GUIs illustrating the suggestion and inclusion (or rejection of inclusion) of suggested additional content in published posts are described below with reference to 4A-4B, 5A-5C, 6A, 6B, or 7A-7C.

In one embodiment, the social networking system utilizes profile information associated with information obtained from the user selecting the link to facilitate the user action. For example, if the action includes the submission of user data, the social networking system facilitates the automatic population of input fields with the user's data.

In one embodiment, the social networking system receives information about the action from the entity or from an aggregator of entities. For example, the social networking system utilizes one or more APIs to receive information from an external server to facilitate the social networking system collecting a donation of money to a specific charitable organization via a selection of additional content in a post and transferring the collected donation to the charitable organization. The received information may include a linkable network address, contact information, input fields for a form, instructions on how to facilitate an action (e.g., a donation), actions taken to date (e.g., funds raised), etc.

In one embodiment, in response to a user taking action via the additional content, the social networking system transmits a suggestion to the user to publish a post including information about the performed action and/or the additional content that affirms support for the entity, as described above. In one embodiment, the suggestion can be transmitted to a user device associated the selecting user (e.g., the user device used to log in to a user account to access the social networking system). For example, the transmitted suggestion is a part of a GUI displayed on the user device in response to the user's action. In one embodiment, the social networking system extracts content from the information from the external server about the action, once performed, to be used for creating a post associated with the user that took the action. For example, the social networking system extracts information about a specific amount that was donated to a particular charity or simply that the user made a donation to the charity.

Figure 4A:
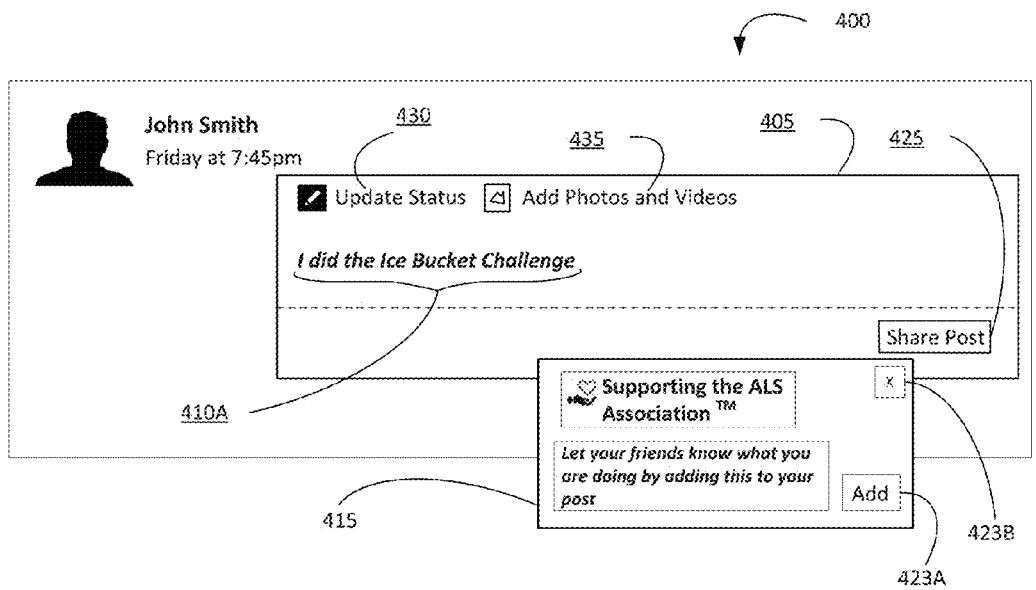
FIGS. 4A-4B illustrate, in an exemplary graphical user interface (GUI), a suggestion to include additional content about supporting an entity and a published post that includes the suggested additional content.
Figure 4B:
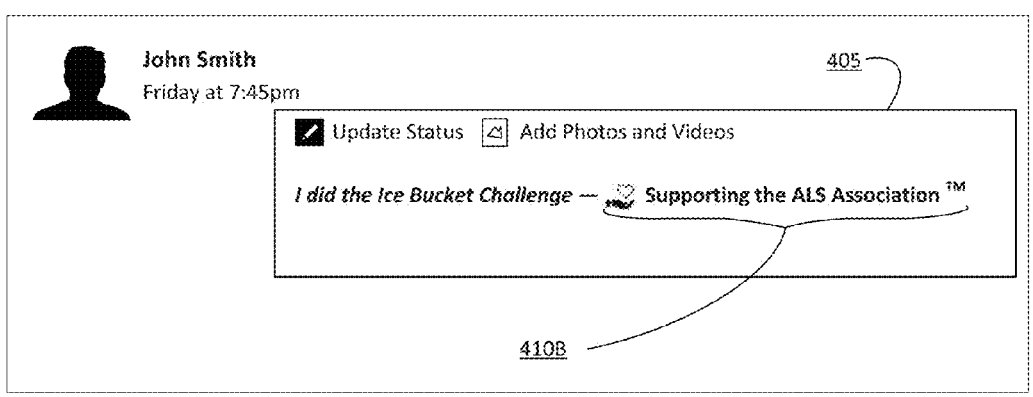

FIGS. 4A-4B illustrate, in an exemplary GUI 400, a suggestion 415 to include additional content about supporting an entity and a published post 405 that includes the additional content 410B in accordance with one embodiment.

Referring to exemplary GUI 400 of FIG. 4A, the social networking system receives input from a user device associated with a user (e.g., User John Smith) for creating a post 405. As illustrated, the received input is a string of text 410A received from a user device associated with the user. In response to receiving text 410A, the social networking system parses the received text 410A and identifies one or more keywords from text 410A. The social networking system maps the identified keyword(s) to an entity. For example and as shown in FIG. 4A, the phrase "Ice Bucket Challenge" is mapped to one or more entities associated with raising awareness for the ALS disease (e.g., the ALS Association™).

The social networking system transmits or otherwise instructs the user device to display a suggestion 415 that includes the identified entity. Suggestion 415 includes GUI elements 423A and 423B, which enable the social networking system to receive input to confirm (GUI element 423A) the inclusion of the suggested additional content or reject (GUI element 423B) the inclusion of the additional content.

In one embodiment, the social networking system receives, via a selection of GUI element 430 on a user device, input(s) to initiate the creation of post 405 and enter text 410A. Additionally the social networking system may receive, via GUI element 435, input(s) for adding photos and/or videos to post 405. Upon selection of GUI element 425, the social networking system publishes post 405.

FIG. 4B illustrates GUI 400 including published post 405 after the social networking system receives confirmation of the inclusion of the additional content (e.g., via selection of GUI element 423A). Published post 405 includes content composed by or selected by the first user for publication to a social networking system (e.g., text 410A) and the additional content suggested by the social networking system for affirming support of an entity (e.g., additional content 410B). As illustrated, additional content 410B includes an image and a string of text, but additional content 410B is not so limited. For example, each of the image and the string of text that make up additional content 410B can also be clickable links to one or more pages associated with the ALS Association™ so that other users interacting with post 405 can easily engage in actions supporting the ALS Associa-tion™. The additional content 410B can be a string of text, a link, a GUI element, a photo, a video, or any combination thereof that is associated with the identified entity.

Figure 5A:
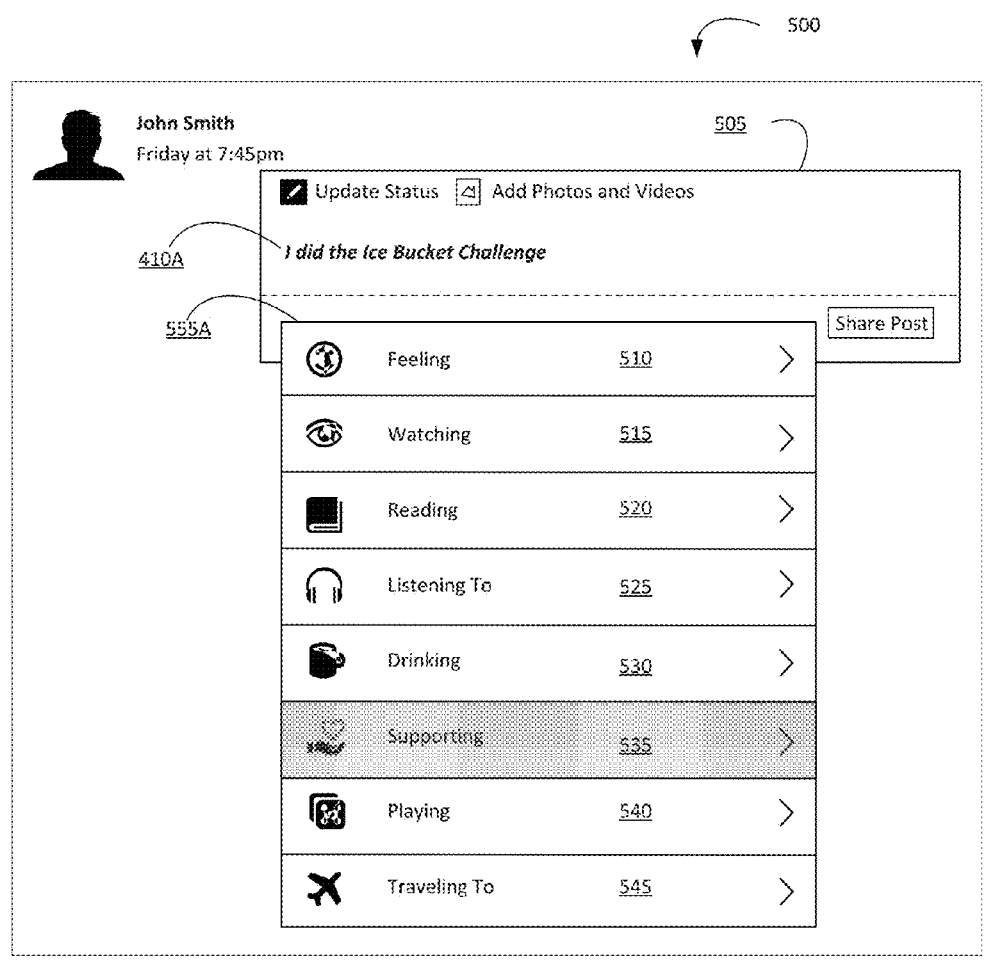
FIGS. 5A-5C illustrate, in an exemplary GUI, a manner of creating a post associated with a user of a social networking system that includes additional content about supporting an entity in accordance with another embodiment.
Figure 5B:
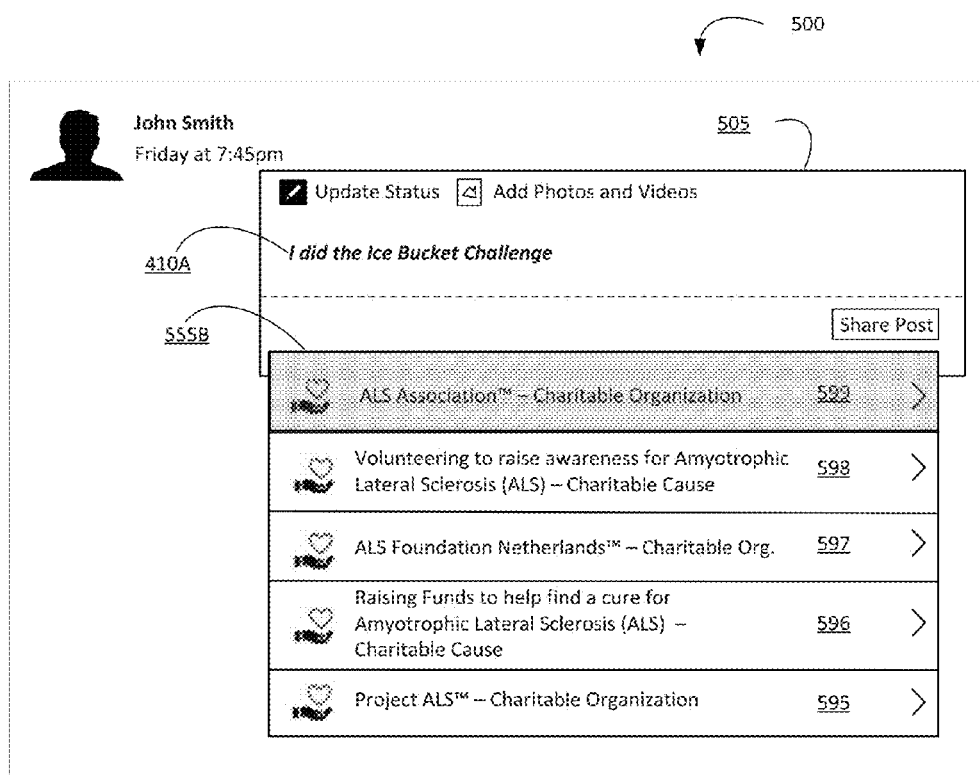
Figure 5C:
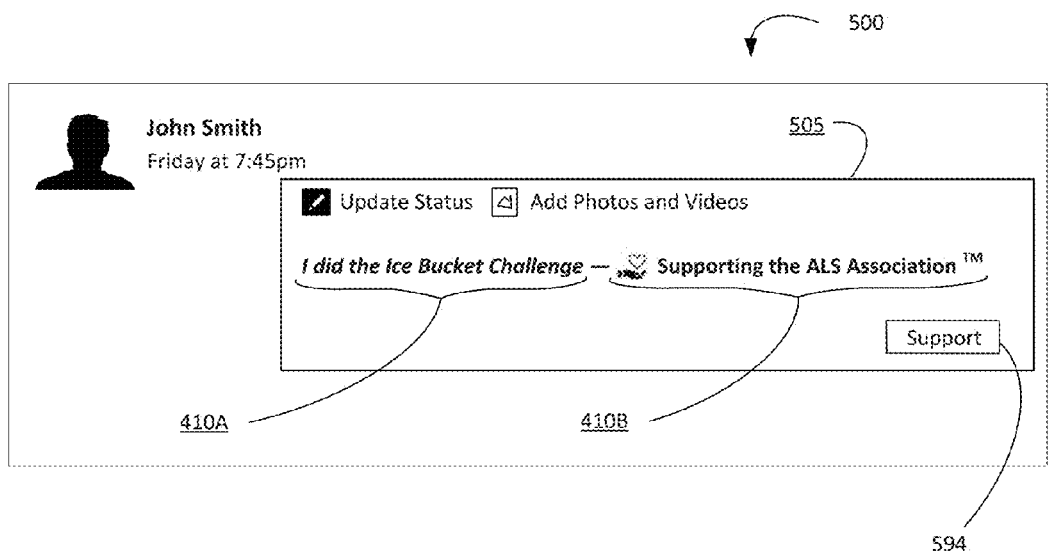

FIGS. 5A-5C illustrate, in an exemplary GUI 500, a manner of creating a post 505 associated with a user of a social networking system that includes additional content about supporting an entity in accordance with another embodiment.

Referring now to FIG. 5A, which illustrates GUI 500 including selectable pre-composed content to be received by the social networking system and used to provide suggestions of additional content for showing support to an entity. In contrast to the example described above, the social networking system receives user input to initiate the selection of pre-composed content and/or the suggestion of additional content. GUI element 555A includes a plurality of selectable GUI elements that enable the social networking system to create a post 505 to be associated with a user (e.g., User John Smith). For example, GUI element 555A includes selectable user interface elements for a user to compose the post 505 about how the user is feeling 510, what the user is watching 515, what the user is reading 520, to what the user is listening 525, what the user is drinking 530, what entity the user is supporting 535, what the user is playing 540, or to where the user is traveling 545. Other pre-composed content/categories (not shown) may also be included in GUI 500. In one embodiment, the social networking system receives input(s), denoted by a selection of GUI element 535, that triggers the social networking system to compose the post 505 about what entity the user is supporting.

FIG. 5B illustrates GUI 500 following the social networking system receiving a selection of GUI element 535. In the illustrated example, the social networking system presents one or more identified entities in response to receiving a selection of the pre-composed content category represented by GUI element 535. GUI element 555B includes a plurality of selectable GUI elements that represent identified entities that have been mapped to the selected category and/or the manually composed content 410A within post 505. For example, the parsing and mapping of content is described above with reference to FIG. 3. As illustrated, GUI element 555B includes selectable user interface elements representing entities related to the content 410A to be published in post 505—GUI element 599 represents the ALS Association™; GUI element 598 represents the cause of volunteering to raise awareness for ALS; GUI element 597 represents the ALS Foundation Netherlands™; GUI element 596 represents a fundraiser to raise funds for a cure for ALS; and GUI element 595 represents Project ALS™. In one embodiment, the social networking system receives input, denoted by a selection of GUI element 599, that triggers the social networking system to include the pre-composed content represented by GUI element 599 in post 405.

FIG. 5C illustrates exemplary GUI 500 following publication of post 505 by the social networking system. In the illustrated example, published post 505 includes content 410A composed by the user and additional content 410B suggested by the social networking system in response to the selection of GUI element 535 and confirmed by the selection of GUI element 599. Furthermore, published post 505 includes selectable GUI element 594 to enable users of the social networking system to perform an action in support of the ALS Association™ For example, GUI element 594 can be a selectable link to one or more pages associated with the ALS Association™ that enables users that "click" the link to provide donations to the ALS Association™, share a message/media on behalf of the ALS Association™, or otherwise take an action to support the ALS Association™. As a further example, in response to the social networking system receiving a selection of GUI element 594 from a user interacting with post 505, the social networking system transmits a webpage associated with the ALS Association™ (a page internal to the social networking system or an external webpage) to the user's device. In one embodiment, the social networking system receives confirmation of user actions taken on the webpage in support of the ALS Association™ (e.g., a donation made by the user through the webpage).

Figure 6A:
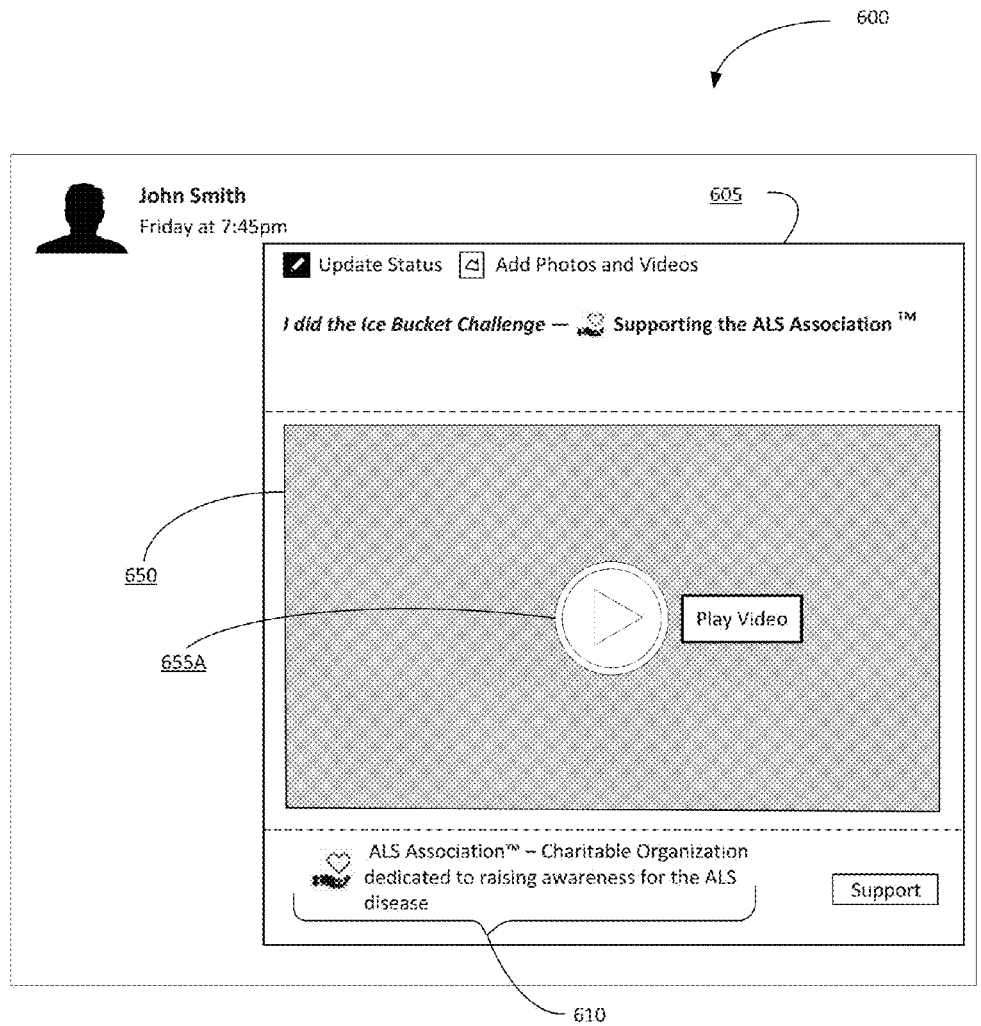
FIG. 6A illustrates, in an exemplary GUI, a published post that includes additional content about supporting an entity prior to playback of media content within the published post.

FIG. 6A illustrates, in an exemplary GUI 600, a published post 605 that includes additional content about supporting an entity prior to playback of media content within the published post 605. GUI 600 includes GUI elements 610 and 650. GUI element 610 provides additional details about the entity supported by the posting user (e.g., User John Smith). For example, GUI element 610 includes text describing the entity, i.e., that the ALS Association™ is a charitable organization that is dedicated to raising awareness for ALS. GUI element 650 includes content (e.g., text, audio, and/or visual media) that can be heard and/or watched by other users of the system interacting with post 605 via user devices. In one embodiment, the suggested and confirmed additional content includes both GUI elements 610 and 650. Alternatively, GUI element 610 represents additional content added, e.g., in response to the social networking system detecting the user's addition of media or other content represented by GUI element 650. Furthermore, GUI element 650 includes a selectable GUI element 655A. The social networking system plays (or causes playback of) the media content represented by GUI element 650 in response to receiving the selection of GUI element 655A.

Figure 6B:
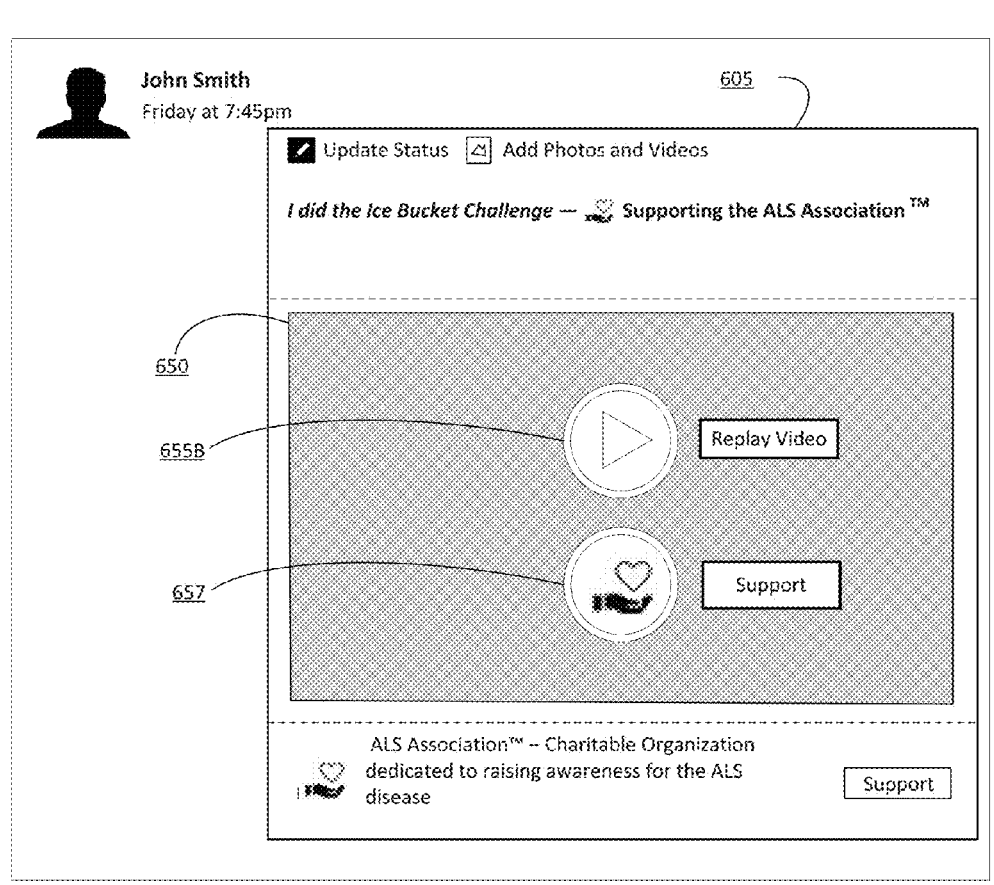
FIG. 6B illustrates, in an exemplary GUI, a published post that includes additional content about supporting an entity following playback of media content within the published post.

FIG. 6B illustrates, in the exemplary GUI 600, the published post 605 that includes additional content after playback of media content has ended.

Following playback of the content represented by GUI element 650, the social networking system presents selectable GUI elements 655B and 657 in GUI element 650. In response to receiving a selection of GUI element 655B, the system replays (or causes the replay of) the media content represented by GUI element 650. Selectable GUI element 657 enables users to perform an action in support, e.g., similar to GUI element 594 described above.

Figure 7A:
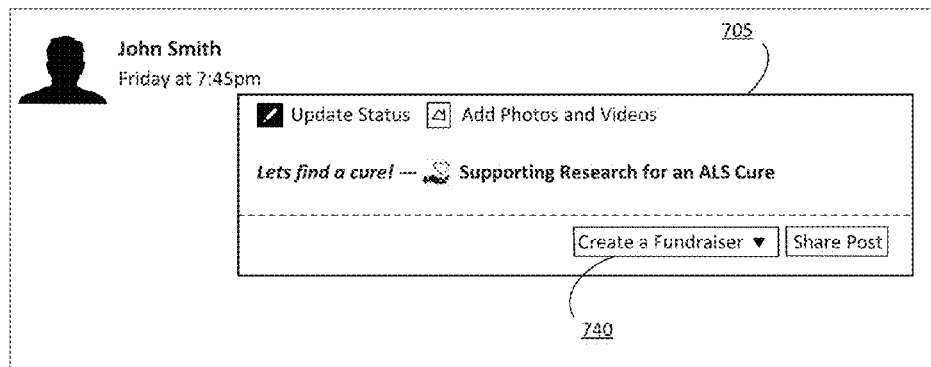
FIGS. 7A-7C illustrate, in an exemplary GUI, a manner of creating a post that includes a fundraiser in support of an entity.
Figure 7B:
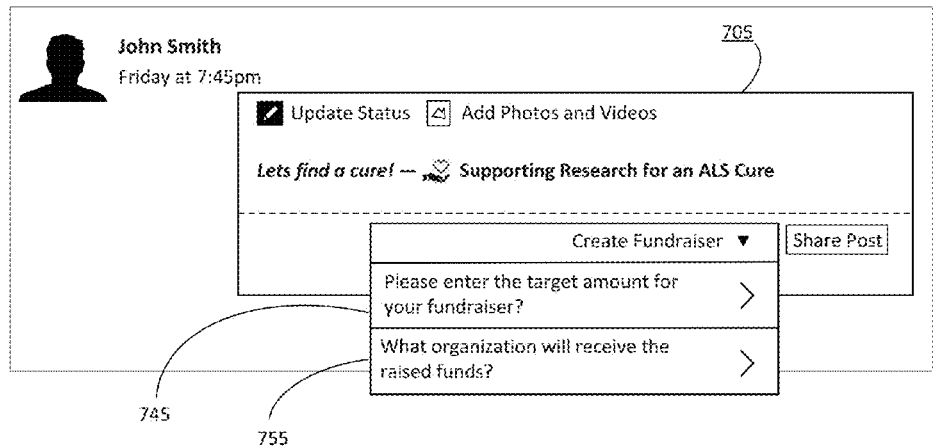
Figure 7C:
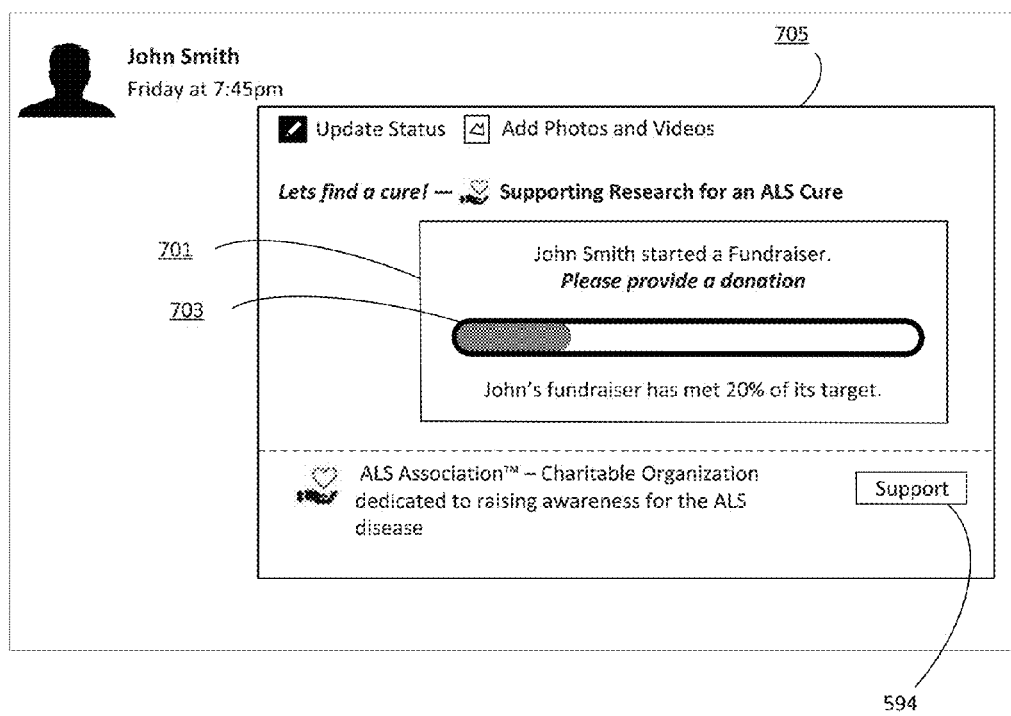

FIGS. 7A-7C illustrate, in an exemplary GUI 700, a manner of creating a post that includes a fundraiser in support of an entity. In one embodiment, the fundraiser is created in response to input(s) received from the user. For example, identification of an entity, inclusion of additional content in a post, and creation of the post are described above with reference to FIGS. 3, 4A-4B, 5A-5C, 6A, and 6B.

Referring now to FIG. 7A, GUI 700 includes a post 705 being composed. During composition, post 705 includes a GUI element 740 to enable the creation of a fundraiser. In one embodiment, in response to receiving a selection GUI element 740, the social networking system facilitates the creation of a fundraiser in support of an entity identified as described herein. As shown, GUI element 740 is a drop-down menu that initiates creation of a fundraiser.

FIG. 7B illustrates GUI 700 following the social networking receiving a selection of GUI element 740. The social networking system provides GUI elements 745 and 755 in response to receiving a selection of GUI element 740. In response to receiving a selection of GUI element 745, the social networking system prompts a user to provide input regarding the target amount of the fundraiser. In response to receiving a selection of GUI element 755, the social networking system prompts a user to provide input(s) designating a destination of the money, goods, services, or promises obtained by the fundraiser. For example, a fundraiser with a goal of raising $5,000.00 can be directed to the ALS Association™ or another charitable associate dedicated to raising awareness of the ALS disease. In one embodiment, the social networking system provides the user with suggested recipients of the fundraiser, e.g., in a manner similar to GUI 500 described with reference to FIG. 5B. Alternatively, the social networking system receives user input indicating the recipient of the fundraiser without or regardless of a suggestion. In one embodiment, the fundraiser has one or more than one recipient/destination.

FIG. 7C illustrates GUI 700 after the social networking system publishes post 705. As shown, published post 705 includes GUI element 701 as an indication of the fundraiser. GUI element 701 includes content (e.g., text, audio, and/or visual media) that provides an indication of progress towards the target amount (e.g., as indicated via GUI element 745) as other users of the system interact with post 705. For example, the social networking system provides a progress bar 703 as part of GUI element 701 and uses the progress bar 703 to display progress towards the target amount. As described above, user selection of GUI element 594 facilitates user action, e.g., by linking the user to an internal or external webpage or form to enable the user to make a donation. In one embodiment, funds are received through the social networking system and accordingly tracked in association with John Smith's fundraiser. Alternatively, the social networking system utilizes an API to request fundraising progress from an external server 115 (e.g., a server for an aggregator of charitable entities, a server for the recipient entity, etc.).

Figure 8:
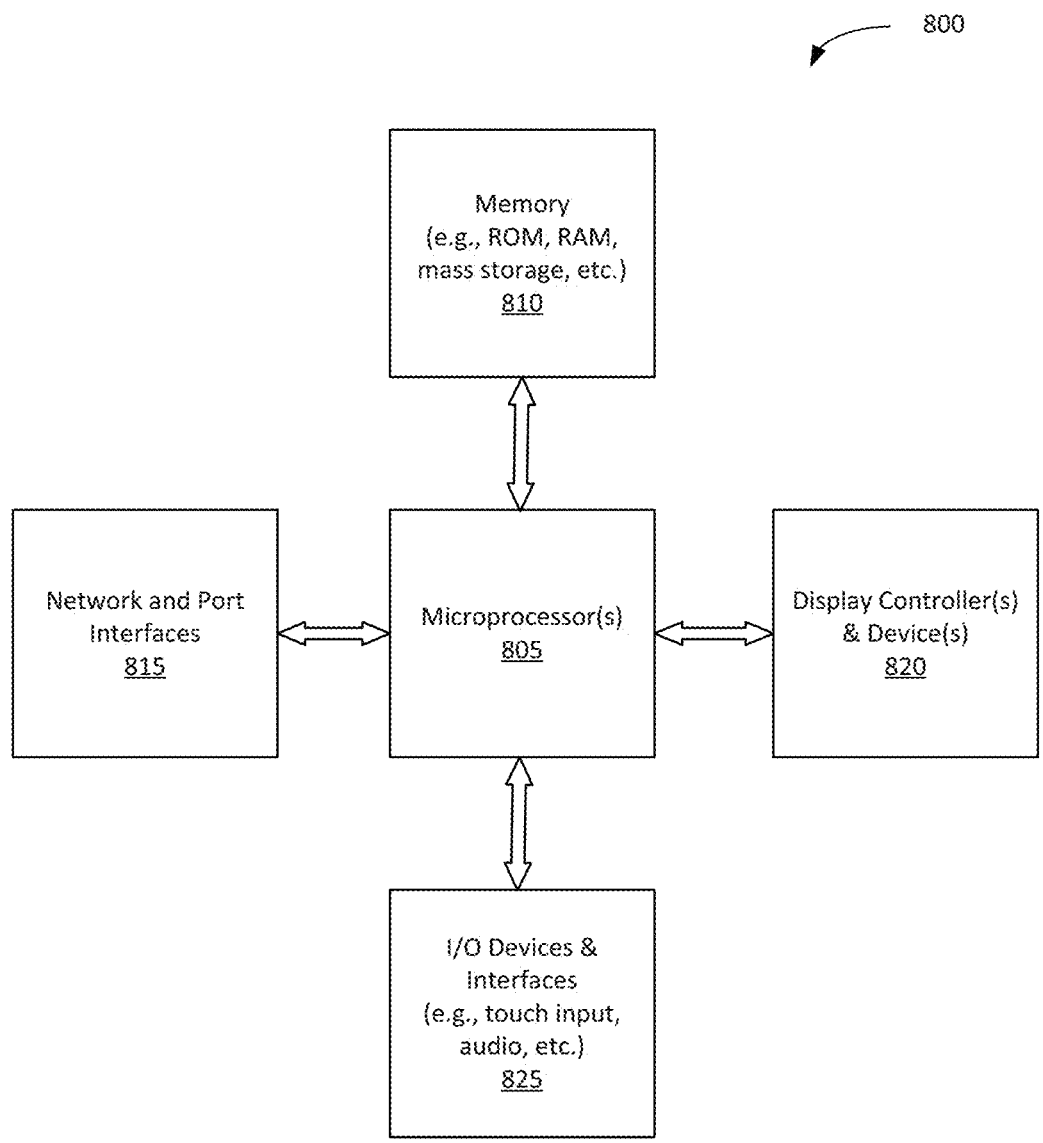
FIG. 8 illustrates, in block diagram form, an exemplary processing system to perform a method of encouraging users of a social networking system to support an entity.

FIG. 8 illustrates, in block diagram form, an exemplary processing system 800 to perform a method of encouraging users of a social networking system to support an entity. For example, processing system 800 encourages users of a social networking system to support an entity of the system in accordance with at least one of the methods described above in FIG. 3, 4A-4B, 5A-5C, 6A, 6B, or 7A-7C. Data processing system 800 includes one or more microprocessors 805 and connected system components (e.g., multiple connected chips). Alternatively, data processing system 800 is a system on a chip.

Data processing system 800 includes memory 810, which is coupled to microprocessor(s) 805. Memory 810 may be used for storing data, metadata, and programs for execution by the microprocessor(s) 805. Memory 810 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 810 may be internal or distributed memory.

Data processing system 800 includes network and port interfaces 815, such as a port, connector for a dock, or a connector for a USB interface, FireWire, Thunderbolt, Ethernet, Fibre Channel, etc. to connect the system 800 with another device, external component, or a network. Exemplary network and port interfaces 815 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 800 with another device, external component, or a network and receive stored instructions, data, tokens, etc.

Data processing system 800 also includes display controller and electronic visual display 820 and one or more input or output ("I/O") devices and interfaces 825. Display controller and electronic visual display 820 provides a visual user interface for the user. I/O devices 825 allow a user to provide input to, receive output from, and otherwise transfer data to and from the system. I/O devices 825 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 8.

Data processing system 800 is an exemplary representation of one or more of the user device 104, external server 115, and one or more components of social networking system 130, or modules thereof (e.g., content suggestion module 129), described above. Data processing system 800 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In one embodiment, data processing system 800 may be a network computer, server, or an embedded processing device within another device or consumer electronic product. As used herein, the terms computer, device, system, processing system, processing device, and "apparatus comprising a processing device" may be used interchangeably with data processing system 800 and include the above-listed exemplary embodiments.

Additional components, not shown, may also be part of data processing system 800, and, In one embodiment, fewer components than that shown in FIG. 8 may also be used in data processing system 800. It will be apparent from this description that aspects of the inventions may be embodied, at least in part, in software. That is, the computer-implemented methods of encouraging users of a social networking system to support an entity represented in the system, as described herein, may be carried out in a computer system or other data processing system 800 in response to its processor or processing system 805 executing sequences of instructions contained in a memory, such as memory 810 or other non-transitory machine-readable storage medium. The software may further be transmitted or received over a network (not shown) via network interface device 815. In one embodiment, hardwired circuitry may be used in combination with the software instructions to implement the present embodiments. Thus, the techniques are not limited to any specific combination of hardware circuitry and software, or to any particular source for the instructions executed by data processing system 800.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the embodiments described herein have been defined with reference to specific exemplary embodiments thereof. Various embodiments and aspects of the embodiment described herein should be referred to with the details discussed herein, and the accompanying drawings illustrate the embodiments described herein. The description above and drawings are illustrative of the embodiments described herein and are not to be construed as limiting any of the embodiments described herein. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in some of the embodiments described herein. Numerous specific details are described to provide a thorough understanding of various embodiments described herein. However, in certain instances, well-known or conventional details are not described in order to provide a concise discussion of the embodiments described herein.

It will be evident that various modifications may be made thereto without departing from the broader spirit and scope of the embodiments described herein as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
accessing a first input associated with a first user profile, the first input comprising a string of text to be published to a communication system;
mapping a key word from the string of text to an entity;
providing, as output for display to a first user device associated with the first user profile, a suggestion to include additional content that is an affirmation of support for the entity along with the received string of text;
accessing a second input confirming inclusion of the additional content;
publishing the string of text and the additional content to the communication system;
accessing a third input associated with a second user profile, wherein the third input includes a link to content of the communication system that enables an action to be performed;

providing, as output for display to a second user device associated with the second user profile, a suggestion to perform the action in support of the entity; and performing the action, in response to receiving a fourth input confirming the performance of the action.

2. The computer-implemented method of claim 1, wherein the first input comprises a user selection of the entity from a plurality of entities and wherein the publishing of the string of text and the additional content is in response to the user selection.

3. The computer-implemented method of claim 1, wherein the additional content comprises a fundraiser for the entity, the fundraiser comprising at least one of:
   a target amount of money, goods, or services to be raised by the fundraiser, or
   a progress bar to visually reflect progress towards the target amount, wherein the progress bar is updated as actions are performed by users of the communication system to raise the target amount.

4. The computer-implemented method of claim 1, wherein the fourth input comprises information associated with the second user profile for performing at least one of a donation of money, a donation of goods, or a donation of services for the entity, and wherein performing the action comprises donating at least one of the money, the goods, or the services based on the fourth input.

5. The computer-implemented method of claim 4, further comprising:
   accessing a fifth input associated with the second user profile, the fifth input comprising information about the performed action;
   providing, as output for display to the second user device, a suggestion to include the additional content that is an affirmation of support for the entity along with the information about the performed action;
   accessing a sixth input confirming the inclusion of the additional content; and
   publishing the information about the performed action and the additional content to the communication system.

6. The computer-implemented method of claim 1, wherein the mapping comprises parsing, for the key word, one or more trending objects of the communication system.

7. The computer-implemented method of claim 1, further comprising:
   accessing information associated with the entity received from an aggregator, wherein the communication system is coupled to the aggregator.

8. A non-transitory computer-readable medium storing instructions thereon that, when executed by at least one processor, cause a computer system to:
   access a first input associated with a first user profile, the first input comprising a string of text to be published to a communication system;
   map a key word from the string of text to an entity;
   provide, as output for display to a first user device associated with the first user profile, a suggestion to include additional content that is an affirmation of support for the entity along with the string of text;
   access a second input confirming inclusion of the additional content;
   publish the string of text and the additional content to the communication system;
   access a third input associated with a second user profile, wherein the third input includes a link to content of the communication system that enables an action to be performed;
   provide, as output for display to a second user device associated with the second user profile, a suggestion to perform the action in support of the entity; and
   perform the action, in response to receiving a fourth input confirming the performance of the action.

9. The non-transitory computer-readable medium of claim 8, wherein the first input comprises a user selection of the entity from a plurality of entities and wherein the publishing of the string of text and the additional content is in response to the user selection.

10. The non-transitory computer-readable medium of claim 8, wherein the additional content comprises a fundraiser for the entity, the fundraiser comprising at least one of:
    a target amount of money, goods, or services to be raised by the fundraiser, or
    a progress bar to visually reflect progress towards the target amount, wherein the progress bar is updated as actions are performed by users of the communication system to raise the target amount.

11. The non-transitory computer-readable medium of claim 10, wherein the fourth input comprises information associated with the second user profile for performing at least one of a donation of money, a donation of goods, or a donation of services for the entity, and wherein performing the action comprises donating at least one of the money, the goods, or the services based on the fourth input.

12. The non-transitory computer-readable medium of claim 11, further comprising instructions that, when executed by the at least one processor, cause the computer system to:
    access a fifth input associated with the second user profile, the fifth input comprising information about the performed action;
    provide, as output for display to the second user device, a suggestion to include the additional content that is an affirmation of support for the entity along with the information about the performed action;
    access a sixth input confirming the inclusion of the additional content; and
    publish the information about the performed action and the additional content to the communication system.

13. The non-transitory computer-readable medium of claim 8, wherein the mapping comprises parsing, for the key word, one or more trending objects of the communication system.

14. The non-transitory computer-readable medium of claim 8, further comprising instructions that, when executed by the at least one processor, cause the computer system to access information associated with the entity received from an aggregator, wherein the communication system is coupled to the aggregator.

15. The non-transitory computer-readable medium of claim 8, further comprising instructions that, when executed by the at least one processor, cause the computer system to:
    determining that the key word from the string of text is a trending topic within the communication system; and
    based on determining the key word is a trending topic, determining that the key word corresponds to a particular entity, wherein mapping the key word from the string of text to the entity is based on determining the key word corresponds to the entity.

16. The non-transitory computer-readable medium of claim 8, further comprising instructions that, when executed by the at least one processor, cause the computer system to publish a user-specified digital photo or digital video with the string of text and the additional content that is an affirmation of support for the entity.

17. The non-transitory computer-readable medium of claim 8, wherein mapping a key word from the string of text to an entity comprises:
- identifying a plurality of entities is associated with the string of text;
- ranking the plurality of entities based on one or more characteristics associated with the first user profile;
- providing a list of entities that comprises the plurality of entities in ranked order; and
- receiving an indication of a user selection of the entity from the list of entities.

18. An system comprising:
- at least one processor; and
- at least one non-transitory computer readable storage medium storing instructions thereon that, when executed by the at least one processor, cause the system to:
  - access a first input associated with a first user profile, the first input comprising a string of text to be published to a communication system;
  - map a key word from the string of text to an entity;
  - provide, as output for display to a first user device associated with the first user profile, a suggestion to include additional content that is an affirmation of support for the entity along with the string of text;
  - access a second input confirming inclusion of the additional content;
  - publish the string of text and the additional content to the communication system;
  - access a third input associated with a second user profile, wherein the third input includes a link to the content of the system that enables an action to be performed;
  - provide, as output for display to a second user device associated with the second user profile, a suggestion to perform the action in support of the entity; and
  - perform the action, in response to receiving a fourth input confirming the performance of the action.

19. The system of claim 18, wherein the first input comprises a user selection of the entity from a plurality of entities and wherein the publishing of the string of text and the additional content is in response to the user selection.

20. The system of claim 18, wherein the additional content includes a fundraiser for the entity, the fundraiser comprising at least one of:
- a target amount of money, goods, or services to be raised by the fundraiser, or
- a progress bar to visually reflect progress towards the target amount, wherein the progress bar is updated as actions are performed by users of the communication system to raise the target amount.

* * * * *